«12» United States Patent
Miyamoto

(10) Patent No.: US 10,291,843 B2
(45) Date of Patent: May 14, 2019

(54) INFORMATION PROCESSING APPARATUS HAVING CAMERA FUNCTION AND PRODUCING GUIDE DISPLAY TO CAPTURE CHARACTER RECOGNIZABLE IMAGE, CONTROL METHOD THEREOF, AND STORAGE MEDIUM

(71) Applicant: CANON KABUSHIKI KAISHA, Tokyo (JP)

(72) Inventor: Daijiro Miyamoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/868,168

(22) Filed: Jan. 11, 2018

(65) Prior Publication Data

US 2018/0213147 A1   Jul. 26, 2018

(30) Foreign Application Priority Data

Jan. 26, 2017 (JP) .................... 2017-011976

(51) Int. Cl.
*H04N 5/232* (2006.01)
*G06K 9/00* (2006.01)
*G06K 9/20* (2006.01)

(52) U.S. Cl.
CPC ..... *H04N 5/23222* (2013.01); *G06K 9/00442* (2013.01); *G06K 9/2054* (2013.01); *G06K 9/2081* (2013.01); *H04N 5/23293* (2013.01); *G06K 2209/01* (2013.01); *H04N 5/23216* (2013.01)

(58) Field of Classification Search
CPC ........... H04N 5/23222; H04N 5/23293; H04N 5/23216; G06K 9/00442; G06K 9/2081; G06K 9/2054; G06K 2209/01
See application file for complete search history.

(56) References Cited

U.S. PATENT DOCUMENTS 6,178,270 B1 * 1/2001 Taylor .................. G06K 9/2054
358/453
7,139,445 B2 * 11/2006 Pilu ........................ G06K 9/228
382/313
7,903,875 B2 * 3/2011 Fujita ................... G06K 9/2054
382/175

(Continued)

FOREIGN PATENT DOCUMENTS

JP           2002024762 A       1/2002

*Primary Examiner* — Shahbaz Nazrul
(74) *Attorney, Agent, or Firm* — Rossi, Kimms & McDowell LLP

(57) ABSTRACT

In order to capture entire object, it is necessary for an image capturer to move a mobile terminal in various directions and to determine whether all is captured, and therefore, the operation of the image capturer becomes complicated. An information processing apparatus having a camera function, which displays a live view image acquired via a camera on a display, determines, by analyzing the live view image, a direction of an uncaptured area that should be captured next and whether the live view image is an image suitable to OCR processing, and displays, in accordance with analysis results of the live view image, a guide to prompt a user to perform an operation so that an image corresponding to the determined direction of the uncaptured area of the object is captured next.

17 Claims, 15 Drawing Sheets

(56) References Cited

U.S. PATENT DOCUMENTS

| | | | |
|---|---|---|---|
| 2002/0012468 A1 | 1/2002 | Togashi et al. | |
| 2002/0131636 A1* | 9/2002 | Hou | G06F 1/1626 382/181 |
| 2003/0169923 A1* | 9/2003 | Butterworth | G06K 9/20 382/181 |
| 2012/0195505 A1* | 8/2012 | Park | G06K 9/344 382/176 |
| 2015/0138399 A1* | 5/2015 | Ma | G06K 9/00624 348/239 |
| 2017/0060821 A1* | 3/2017 | Rucine | G06F 17/212 |

\* cited by examiner

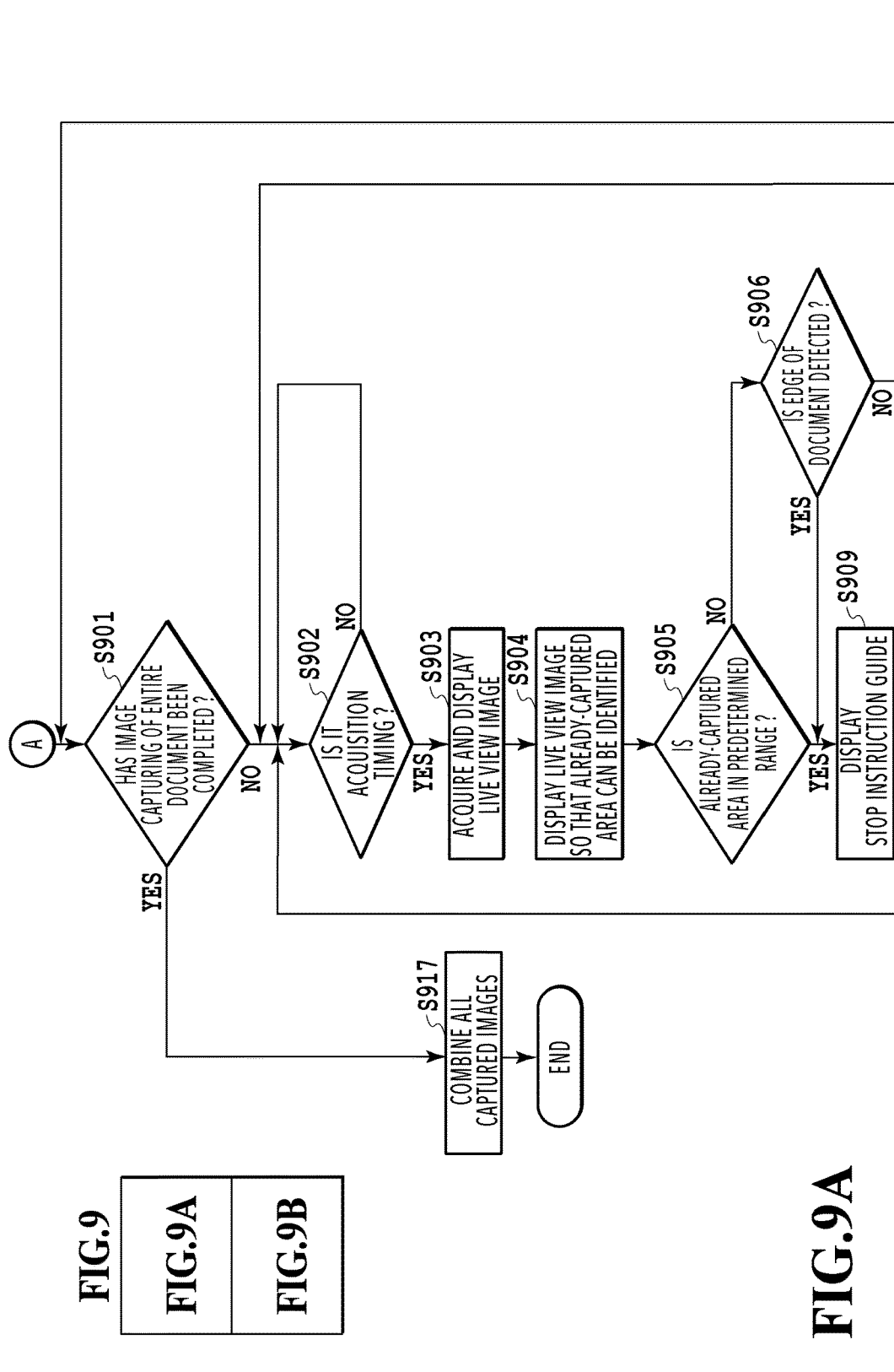

FIG.12

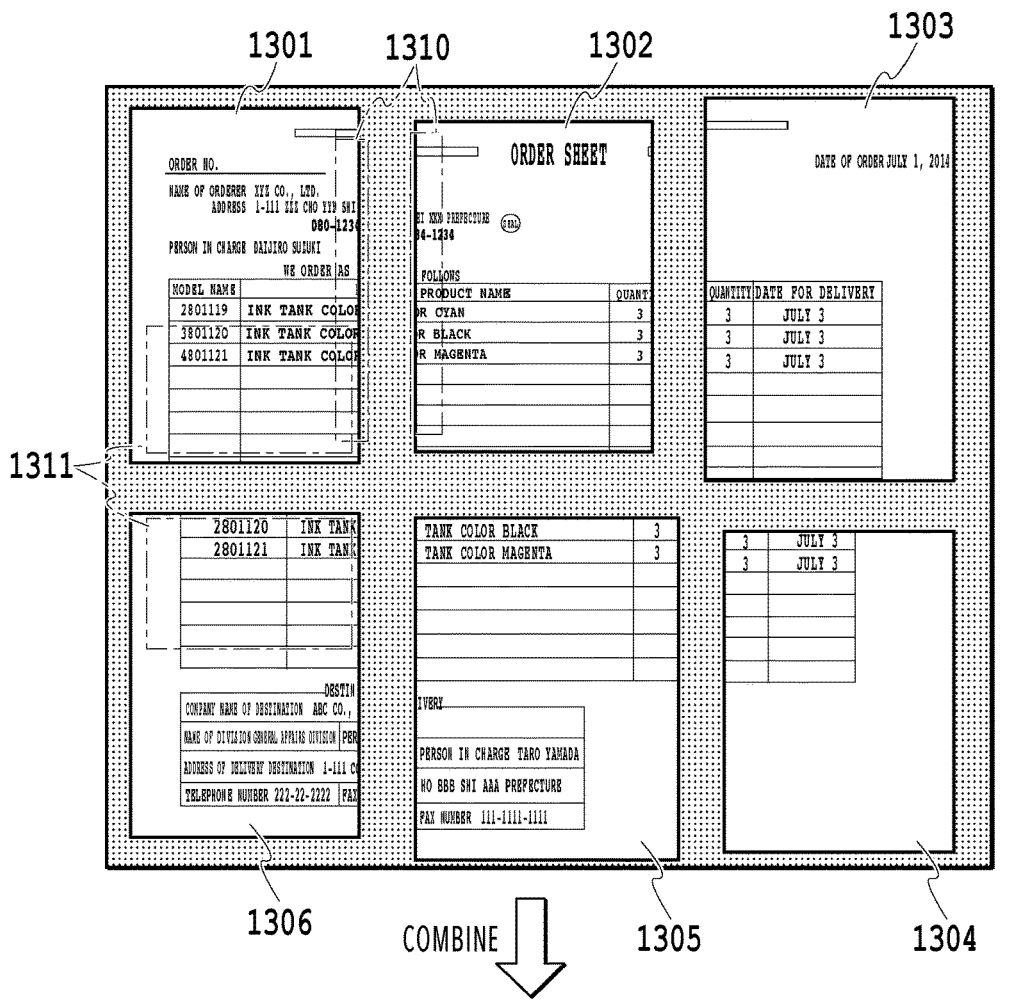
FIG.13

INFORMATION PROCESSING APPARATUS HAVING CAMERA FUNCTION AND PRODUCING GUIDE DISPLAY TO CAPTURE CHARACTER RECOGNIZABLE IMAGE, CONTROL METHOD THEREOF, AND STORAGE MEDIUM

BACKGROUND OF THE INVENTION

Field of the Invention

The present invention relates to a control technique of a guide display at the time of capturing a character recognizable image.

Description of the Related Art

In recent years, at the time of acquiring information on a character and the like included in a document, such as a business form, the cases are increasing in number where the information is not read by a dedicated scanner and the like, but the information is captured by a camera function attached to a mobile device (hereinafter, called a "mobile terminal"), such as a smartphone and a tablet. However, generally, the resolution of a camera of a mobile terminal is low compared to that of a scanner. Because of this, in order to capture an entire document of a large sheet size, such as A3, in a state where character recognition with a predetermined or higher accuracy is possible in subsequent character recognition processing (OCR processing), it is necessary to perform image capturing by dividing the image capturing into a plurality of times.

Regarding this point, Japanese Patent Laid-Open No. 2002-024762 has proposed a method of generating one document image by linking a plurality of images captured by moving a camera and performing OCR processing, and in the case where the character recognition results are erroneous, capturing the erroneously recognized portion in the zoom mode and performing OCR processing again.

The above-described Japanese Patent Laid-Open No. 2002-024762 premises that an image capturer him/herself has grasped in advance which area within a target document is important or necessary for character information. However, for example, in the case where an image capturer and a user who uses a captured image are different persons, a case is considered where the image capturer him/herself has not grasped which area within a target document is important or necessary for character information. In such a case, image capturing is performed by notifying the image capturer of a portion desired to be captured for each kind or each use of a target document, but there is a possibility that a desired captured image is not acquired because of an information transmission error and the like. Consequently, it is desirable to obtain a plurality of captured images covering the entire target document with a predetermined or higher image quality. In this case, it is necessary for an image capturer to move his/her mobile terminal many times in various directions at appropriate focal lengths or to determine whether the entire document is captured, and therefore, the burden of the image capturer is heavy.

Consequently, an object of the present invention is to make is possible to easily perform image capturing with an image quality suitable to OCR processing in the case where a user captures an entire target document by a mobile terminal by dividing image capturing into a plurality of times.

SUMMARY OF THE INVENTION

The information processing apparatus according to the present invention is an information processing apparatus having a camera function, including: a memory for storing a computer program; and a processor for executing the computer program to perform: controlling to display a live view image acquired via a camera; determining, by analyzing the live view image, a direction of an uncaptured area that should be captured next and whether the live view image is an image suitable to OCR processing; and controlling, in accordance with analysis results of the live view image, to display a guide on the live view image in an overlapping manner, wherein the displayed guide is a guide to prompt a user to perform an operation so that an image corresponding to the determined direction of the uncaptured area of the object is captured next.

Further features of the present invention will become apparent from the following description of exemplary embodiments with reference to the attached drawings.

BRIEF DESCRIPTION OF THE DRAWINGS

FIG. 12 is a diagram showing a total of six captured images captured by dividing image capturing into six times;

FIG. 13 is a diagram showing the way one entire image is finished by combining six captured image.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

As an example of an information processing apparatus having a camera function according to the present embodiment, in the following, explanation is given by taking a mobile terminal with a camera as an example. A so-called tablet PC or smartphone is a typical example of a mobile terminal capable of image capturing and data communication in an arbitrary place due to installation of a wireless communication function and the like.

Figure 1:
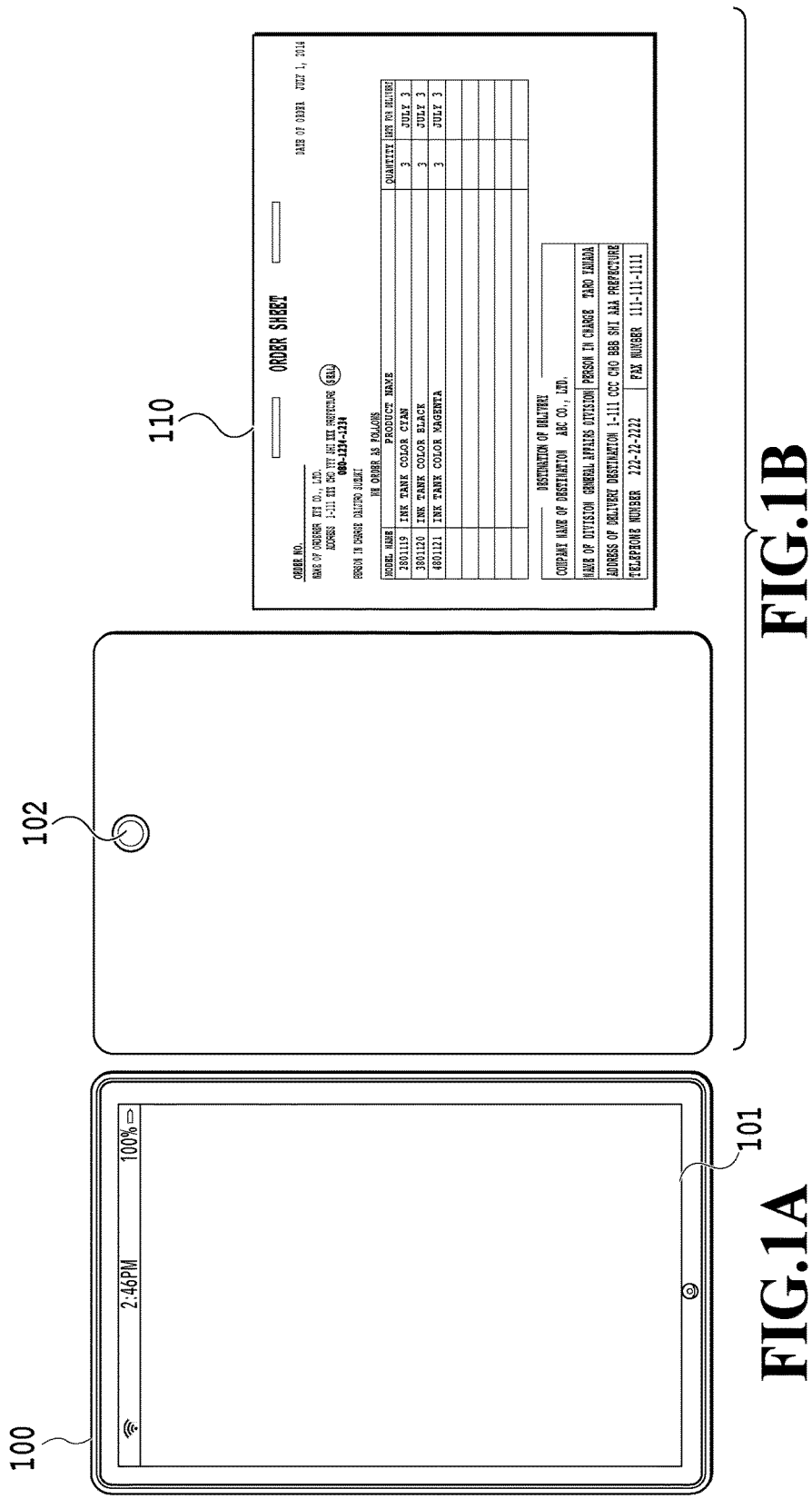
FIG. 1A and FIG. 1B are diagrams showing an example of an external appearance of a mobile terminal.

FIG. 1A and FIG. 1B are diagrams showing an example of an external appearance of a mobile terminal. FIG. 1A shows the surface side (front side) of a mobile terminal 100 on which a touch panel 101 as a display unit exists. The touch panel 101 includes, for example, a capacitive LCD and the like, and includes two functions, that is, a function to output (display) information and a function to input information. FIG. 1B shows the backside (rear side) of the mobile terminal 100. On the rear side of the mobile terminal, an image capturing lens (hereinafter, a "lens") 102 to take in an image is included. In the present embodiment, a user of the mobile terminal 100 captures a document (here, an order sheet 110), which is an object, by using a mobile application, to be described later. The object may be a character or the like that is written to a large-sized photo or a whiteboard, in addition to a paper document, such as the order sheet 110. It is possible for the mobile application, to be described later, to take in an image of an object and display the taken-in image on the touch panel 101.

[Hardware Configuration]

Figure 2:
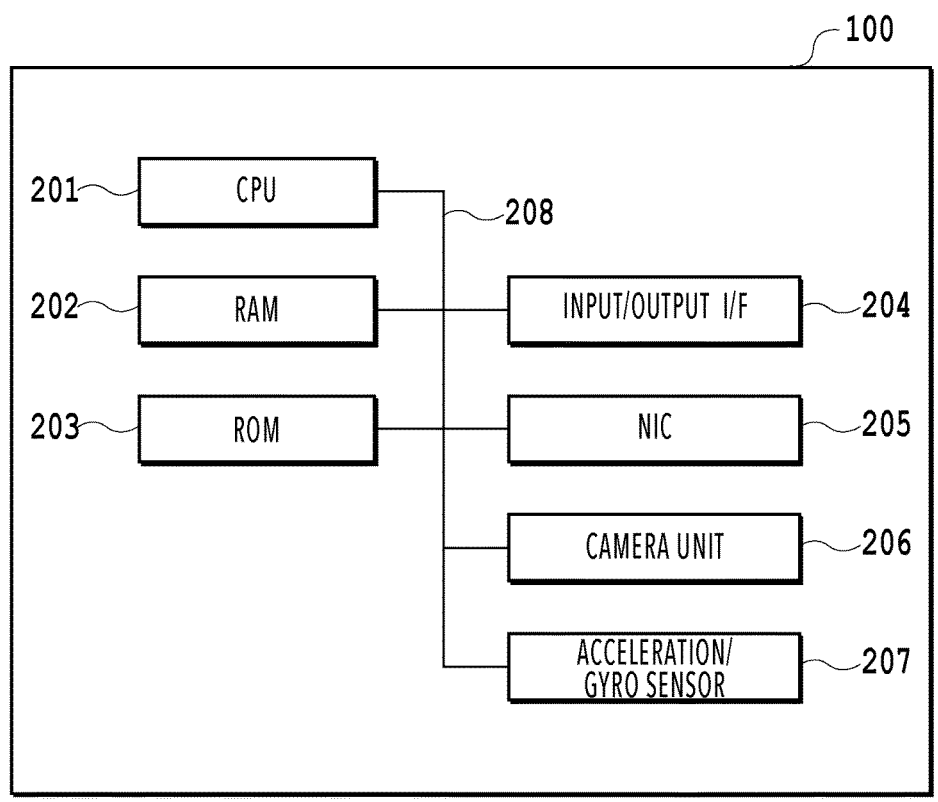
FIG. 2 is a diagram showing an example of a hardware configuration of the mobile terminal.

Following the above, a hardware configuration of the mobile terminal 100 is explained. FIG. 2 is a diagram showing an example of a hardware configuration of the mobile terminal 100. The mobile terminal 100 includes a CPU 201, a RAM 202, a ROM 203, an input/output I/F 204, a NIC 205, a camera unit 206, and an acceleration/gyro sensor 207 and each of these units is connected to one another by a bus 208.

The CPU 201 is a central processing unit that implements various functions by executing various programs. The RAM 202 is a readable/writable memory storing various pieces of information. The RAM 202 is also made use of as a work area of the CPU 201. The ROM 203 is a memory storing an OS and various programs, such as the above-described image capturing application. For example, the CPU 201 loads a program stored in the ROM 203 onto the RAM 202 and executes the program. Further, it is also possible for the CPU 201 to read a program stored in an external storage device (not shown schematically), such as a flash memory, an HDD, and an SSD, and to execute the program. It may also be possible to implement all or part of the functions of the mobile terminal 100 and the processing according to sequences, to be described later, by using dedicated hardware.

The input/output I/F 204 is an interface that outputs display data to the touch panel 101 and receives input information from the touch panel 101. The NIC (Network Interface Card) 205 is an interface to connect the mobile terminal 100 to a network (not shown schematically). The camera unit 206 takes in an image of an object to the mobile terminal 100 via the lens 102. The bus 208 is a data communication path that connects each unit described above. The acceleration/gyro sensor 207 is a sensor that detects attitude information on the mobile terminal 100.

[Software Configuration]

Figure 3:
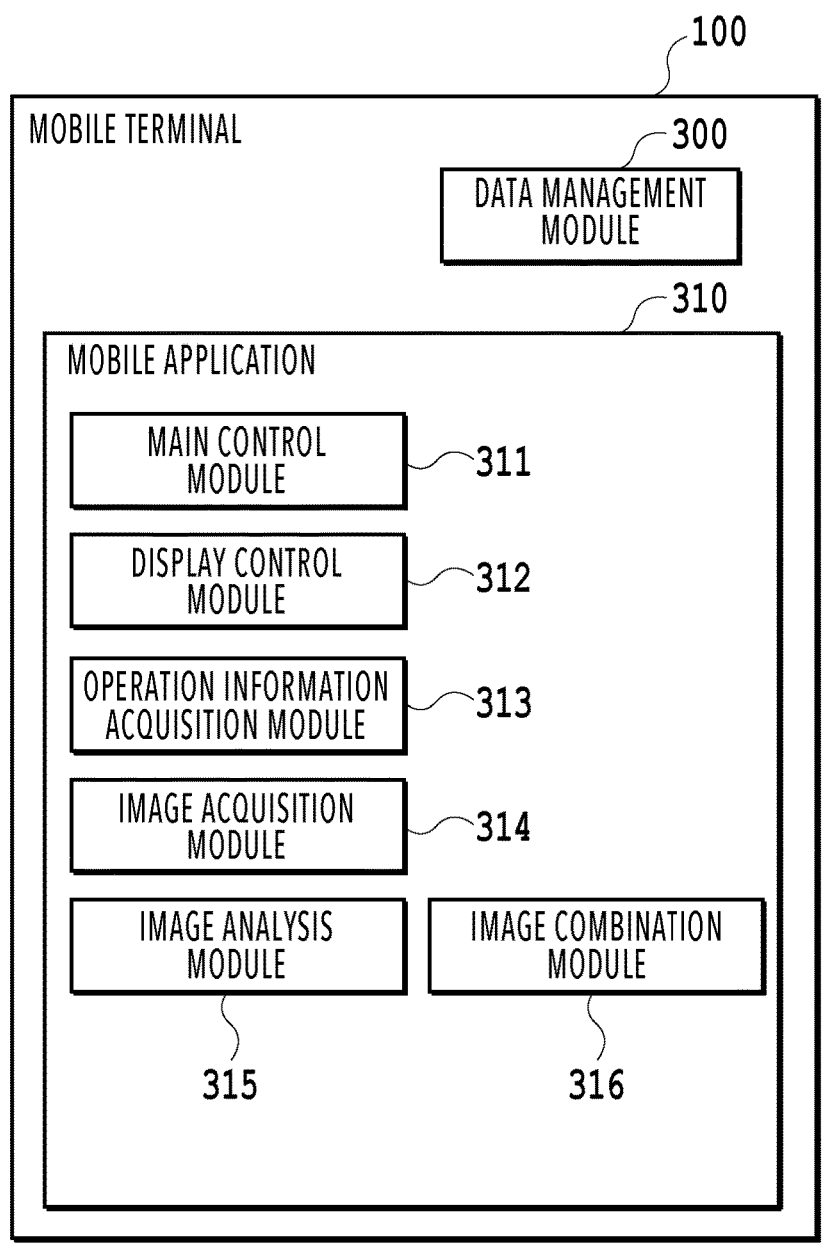
FIG. 3 is a diagram showing an example of a software configuration of the mobile terminal.

Next, a software configuration of the mobile terminal 100 is explained. FIG. 3 is a diagram showing an example of a software configuration of the mobile terminal 100. The software of the mobile terminal 100 includes a data management module 300 and a mobile application 310. Then, the mobile application 310 includes a plurality of modules 311 to 316 corresponding to each function of main control, display control, operation information acquisition, image acquisition, image analysis, and image combination. As described previously, a program corresponding to each of these modules is stored in the ROM 203 and the like.

The data management module 300 manages image data captured by the camera unit 206, processing data (application data) in the mobile application 310, and so on. The mobile application 310 accesses various pieces of data managed by the data management module 300 by making use of a control API (Application Programming Interface) provided by an OS, not shown schematically.

It is possible for a user to download and install the mobile application 310 by making use of an installation function of the OS of the mobile terminal 100. The mobile application 310 performs image capturing of a target document by using the camera unit 206 and performs various kinds of processing for the obtained captured image data.

Figure 4:
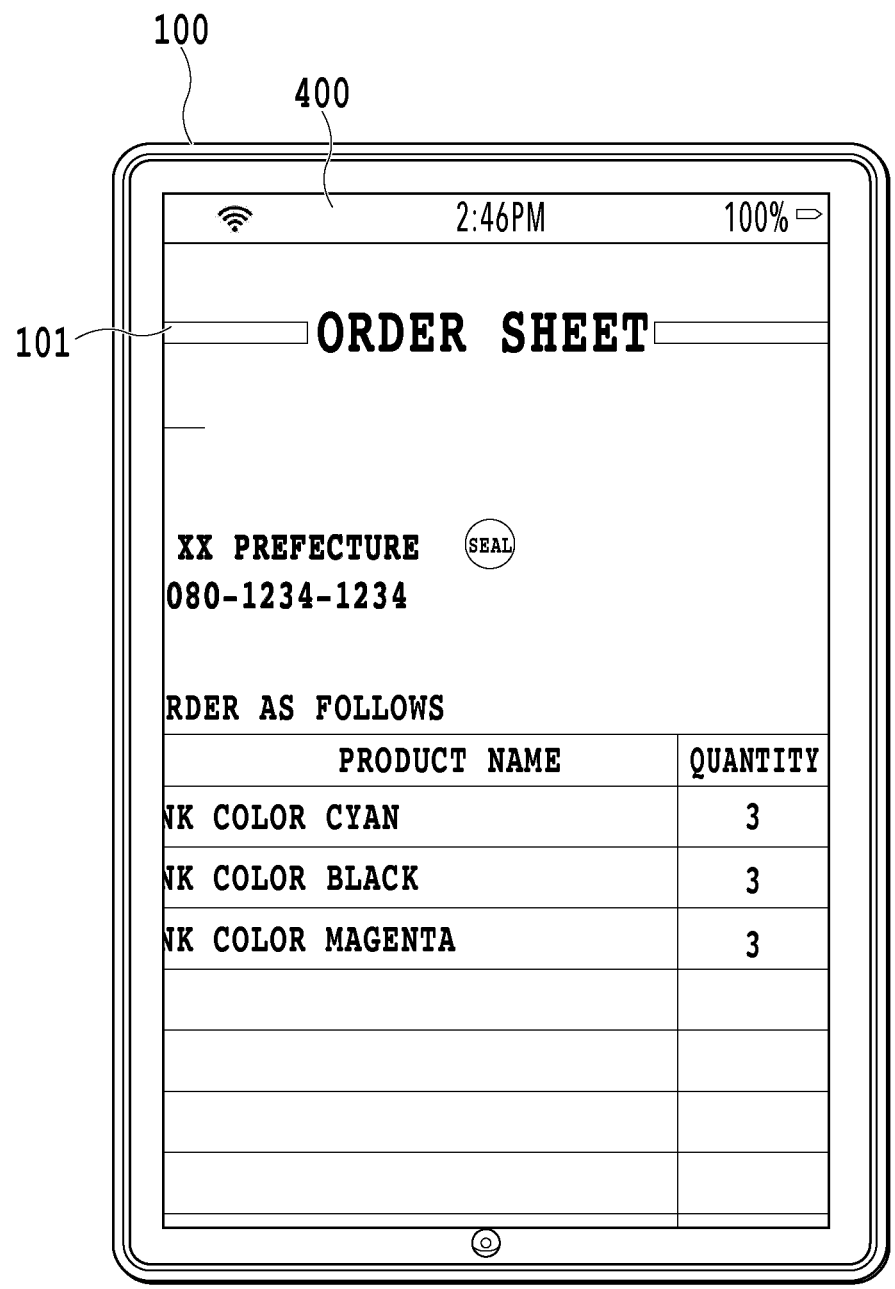
FIG. 4 is a diagram showing an example of a UI screen of a mobile application.

The main control module 311 is a module that centralizedly controls the mobile application 310 and gives instructions to and performs management of each of the following modules 312 to 316. The display control module 312 provides a user interface (UI) of the mobile application 310 in accordance with instructions from the main control module 311. FIG. 4 is a diagram showing a display state of the touch panel 101 at the time of activation of the mobile application 310. Here, in a display/operation area 400 of the touch panel 101, an image (live view image) taken in via an image capturing sensor of the camera unit 206 is displayed and it is possible for a user to perform various operations for the live view image. Further, the display control module 312 displays an operation guide to capture an image suitable to OCR on the live view image being displayed in an overlapping manner. It is needless to say that the configurations (position, size, range, arrangement, display contents, and so on) of the UI of the mobile application 310 are not limited to those shown schematically.

The operation information acquisition module 313 acquires input information relating to a user operation via the touch panel 101 and delivers the acquired input information to the main control module 311. For example, in the case where a user touches the display/operation area 400 by his/her hand, the operation information acquisition module 313 detects the touched position and transmits information on the detected position to the main control module 311.

The image acquisition module 314 acquires an image taken in by the image capturing sensor of the camera unit 206. Further, the image acquisition module 314 converts the resolution of the acquired image into an arbitrary resolution in accordance with the necessity in the case where, for example, an image with a resolution reduced lower than that of an image to be saved is displayed on a display.

The image analysis module 315 performs various kinds of image processing for a captured image acquired by the image acquisition module 314. For example, the image analysis module 315 performs feature point extraction to track an image capturing area, character recognition (OCR) to acquire character information, straight line recognition to detect corners (typically four corners) and edges (sides) of a document, which is an object, and so on.

The image combination module 316 generates one image (entire image) corresponding to the entire target document by linking captured images. At this time, the image combination module 316 also performs processing, such as paper surface detection to exclude areas other than an object, enlargement/reduction, and distortion correction to correct a distorted portion, for the captured image.

[Image Capturing Flow]

Figure 5:
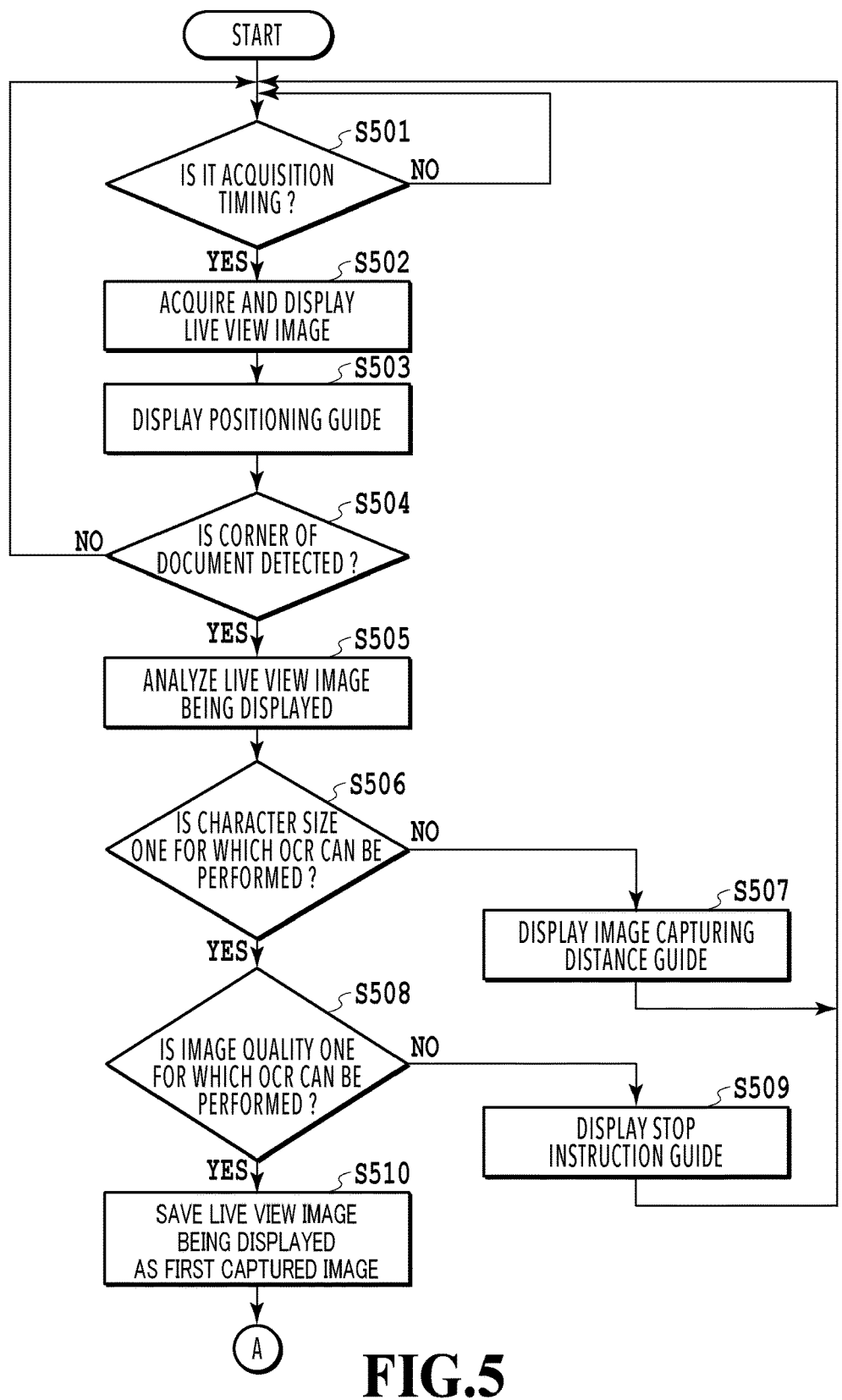
FIG. 5 is a flowchart showing a flow of processing until a first captured image is acquired.

Following the above, an image capturing flow is explained, in which a target document, such as a business form, is captured by using the mobile terminal 100 by dividing image capturing into a plurality of times and an entire image of the target document is generated. FIG. 5 is a flowchart showing a flow of processing at the time of performing the first image capturing of a plurality of times of image capturing (flow of processing until the first captured image is acquired). This flow starts by, for example, a user activating the mobile application 310 as a trigger.

At step 501, the main control module 311 determines whether it is timing to acquire data of a live view image taken in via the image capturing sensor of the camera unit 206. The intervals at which a live view image is acquired (intervals at which the image capturing sensor of the camera unit 206 takes in an image) are predetermined intervals, for example, 100 msec intervals. In the case where the main control module 311 determines that it is timing to acquire a live view image, the processing advances to step 502.

Figure 6:
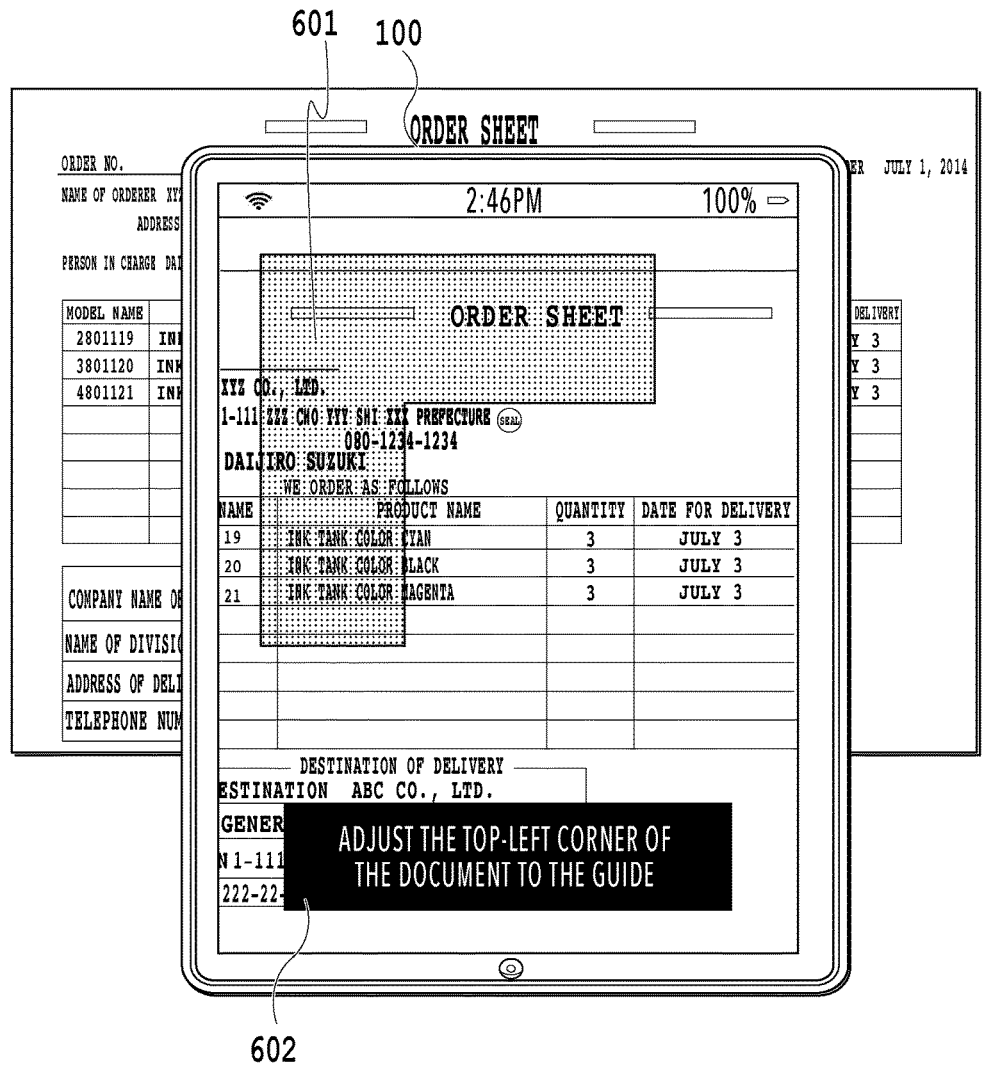
FIG. 6 is a diagram showing an example of a positioning guide.

At step 502, the image acquisition module 314 acquires data of a live view image. In accordance with the necessity, resolution conversion processing is performed for the acquired live view image and the live view image is displayed in the display/operation area 400 of the touch panel 101 by the display control module 312. At step 503 that follows, the display control module 312 displays a positioning guide to adjust the position (initial position) at which image capturing starts on the live view image being displayed in an overlapping manner. Specifically, the display control module 312 displays a guide display to prompt a user to perform an operation so that the corner (here, top-left corner) of a target document is located at a specific position within the display/operation area 400 on the live view image in an overlapping manner. FIG. 6 is a diagram showing an example of the positioning guide and an L-shaped area 601 is highlighted in a different color and at the same time, a message 602 to prompt a user to move the mobile terminal 100 so that the top-left corner of the target document is included within the area is displayed. In the present embodiment, the top-left corner of the target document is taken to be the initial position, but it may also be possible to start image capturing by taking a corner other than the top-left corner to be the initial position. It is needless to say that in the case where a corner other than the top-left corner is taken to be the initial position, the contents (shape of the area 601 and the like) of the positioning guide change accordingly.

At step 504, the image analysis module 315 determines whether a user operation in accordance with the positioning guide has been performed by analyzing the live view image being displayed. Specifically, the image analysis module 315 performs processing to detect the corner (top-left corner) of the document for the area 601 in the positioning guide. For the corner detection, the publicly known image analysis method, such as straight line extraction, may be applied and the corner detection is performed for the portion of the area 601 of the positioning guide of the live view image being displayed. In the case where the performance of the CPU 201 is sufficiently high, it may also be possible to perform the corner detection for the entire live view image being displayed. In the case where the results of the determination indicate that the corner is detected, the processing advances to step 505. On the other hand, in the case where no corner is detected, the processing returns to step 501 and the processing is performed again from acquisition of a live view image.

At step 505, the image analysis module 315 performs an image analysis in order to check whether the live view image being displayed is an image suitable to OCR processing. Specifically, the image analysis module 315 extracts an area in which a character is included by the publicly known image area separation method and the like and finds its height and specifies a character size, extracts an edge of an image of a character portion and finds definition of the edge, and so on. Further, it may also be possible to find whether reliability of the extracted character is at a predetermined or higher level by actually performing OCR processing for the live view image being displayed. The contents of the analysis processing are determined by also taking into consideration the performance of the CPU 201 and the like.

At step 506, the image analysis module 315 determines whether the character size within the text area included in the live view image being displayed is a predetermined character size suitable to OCR processing based on the character size information of the results of the analysis at step 506. Whether the character size is a predetermined character size is determined by determining, for example, whether the point is within a range of n point±2 points. In the case where it is determined that the size of the character included in the live view image being displayed is not a size suitable to OCR processing, the processing advances to step 507. On the hand, in the case where it is determined that the character size is a size suitable to OCR processing, the processing advances to step 508.

Figure 7A:
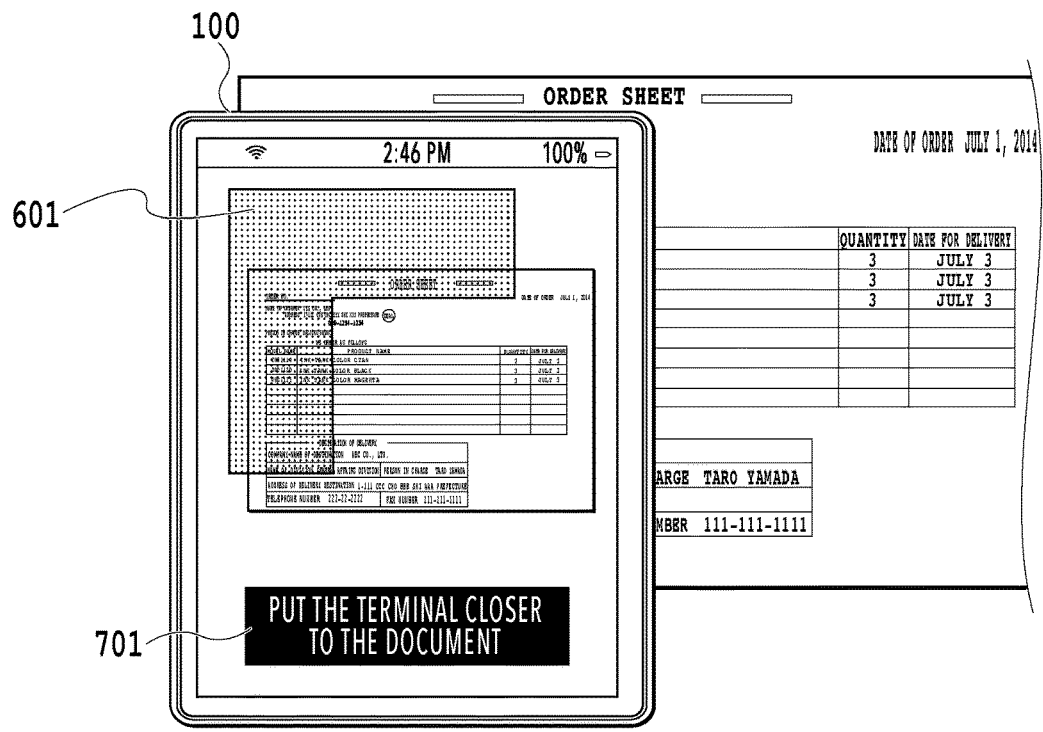
FIG. 7A and FIG. 7B are each a diagram showing an example of a message of an image capturing distance guide.
Figure 7B:
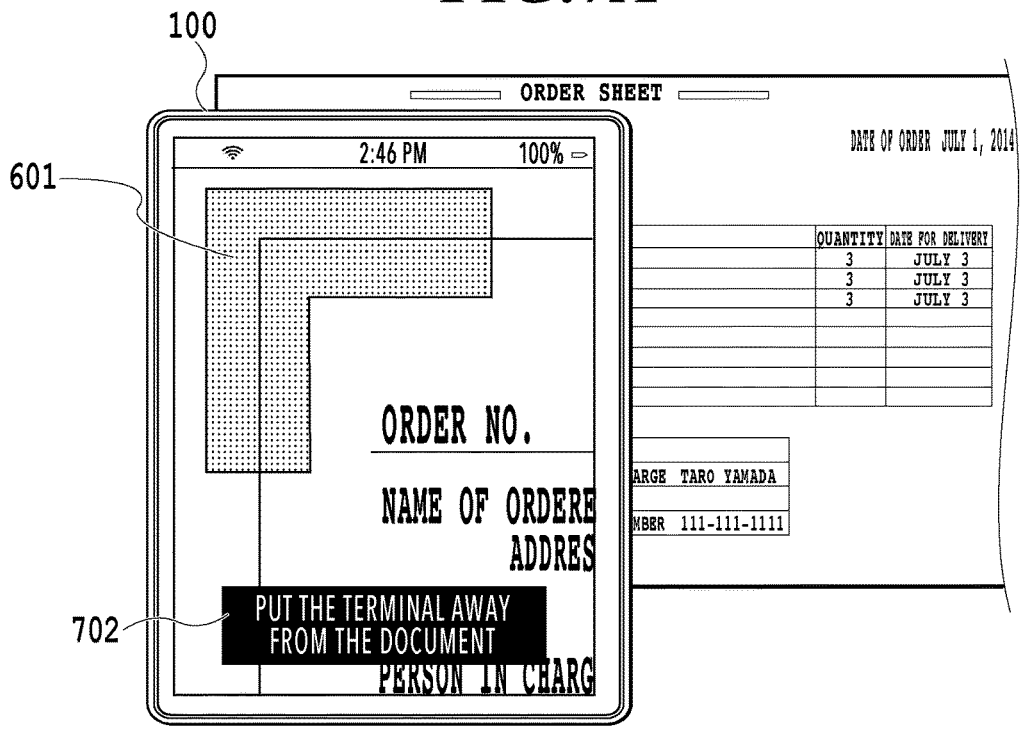

At step 507, the display control module 312 changes the contents of the guide display to contents (image capturing distance guide) to prompt a user to perform an operation so that the distance between the image capturing lens 102 and the target document becomes appropriate. Specifically, the display control module 312 changes the contents of the message 602 while leaving the display of the above-described area 601 as it is. FIG. 7A and FIG. 7B are diagrams each showing an example of a message of the image capturing distance guide. For example, in the case where it is determined that the character size is too small at step 506, as shown in FIG. 7A, a message, such as "Put the terminal closer to the document", is displayed. In the case where it is determined that the character size is too large, as shown in FIG. 7B, a message, such as "Move the terminal away from the document", is displayed. After the display processing is completed, the processing returns to step 501.

At step 508, the image analysis module 315 determines whether the character within the text area included in the live view image being display has definition in a degree in which a predetermined or higher character recognition rate can be secured based on the character edge information of the results of the analysis at step 506. In the case where it is determined that the definition of the character included in the live view image being displayed is poor and the image quality is not suitable to OCR processing, the processing advances to step 509. On the other hand, in the case where it is determined that the definition of the character is good and the image quality is suitable to OCR processing, the processing advances to step 510.

Figure 8:
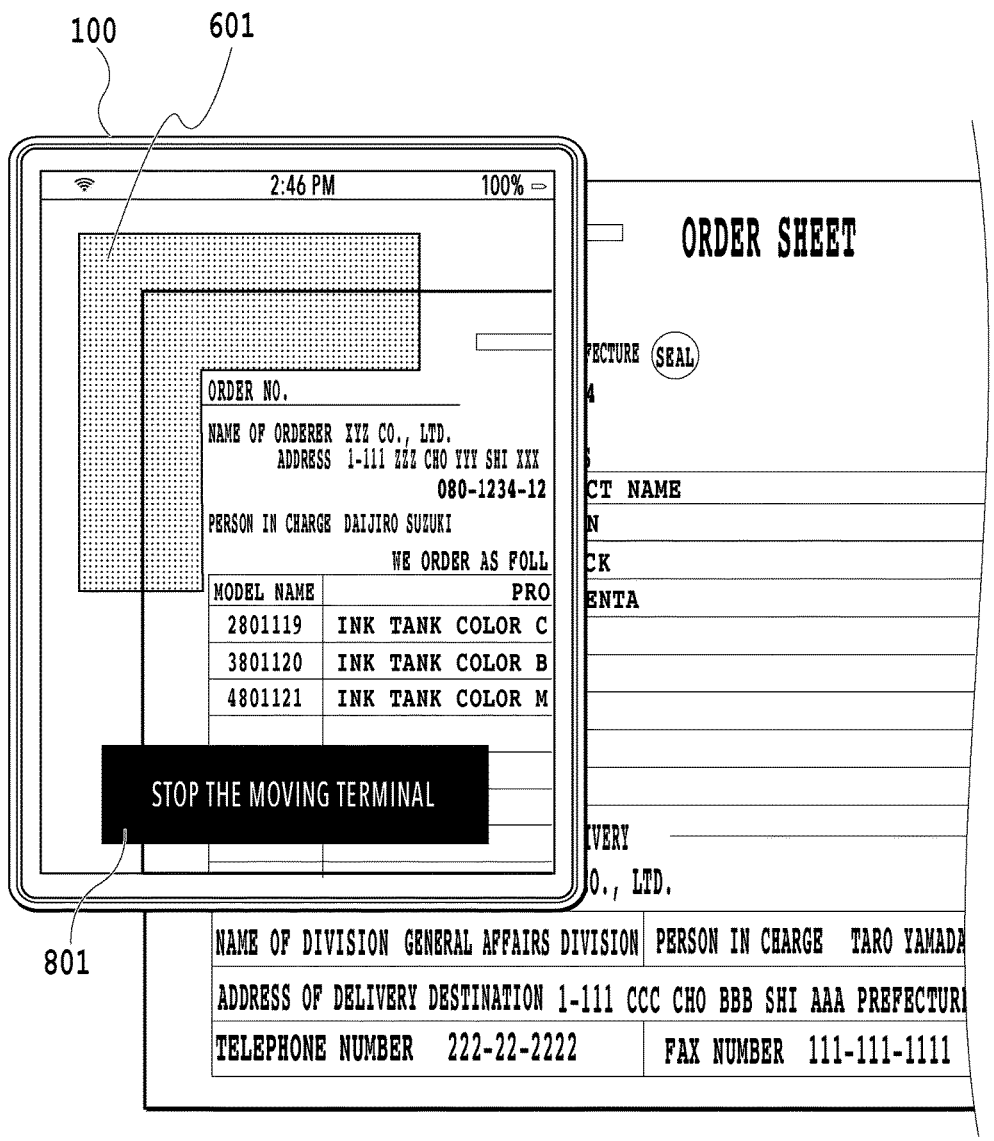
FIG. 8 is a diagram showing an example of a message in a stop instruction guide.

As the cause of poor definition of a character, a camera-shake is considered, and therefore, at step 509, the display control module 312 changes the contents of the guide display to contents (stop instruction guide) to prompt a user to perform an operation so that the definition of the character in the target document becomes good (so that the camera-shake is stopped). FIG. 8 is a diagram showing an example of the message in the stop instruction guide. As shown in FIG. 8, the message 602 is changed to a message 801 with contents, such as "Stop the terminal", while leaving the display of the above-described area 601 as it is.

At step 510, the image combination module 316 saves (stores in the RAM 202) the live view image acquired at step 502 as the first captured image of a plurality of captured images used for combination processing, to be described later.

Figure 9B:
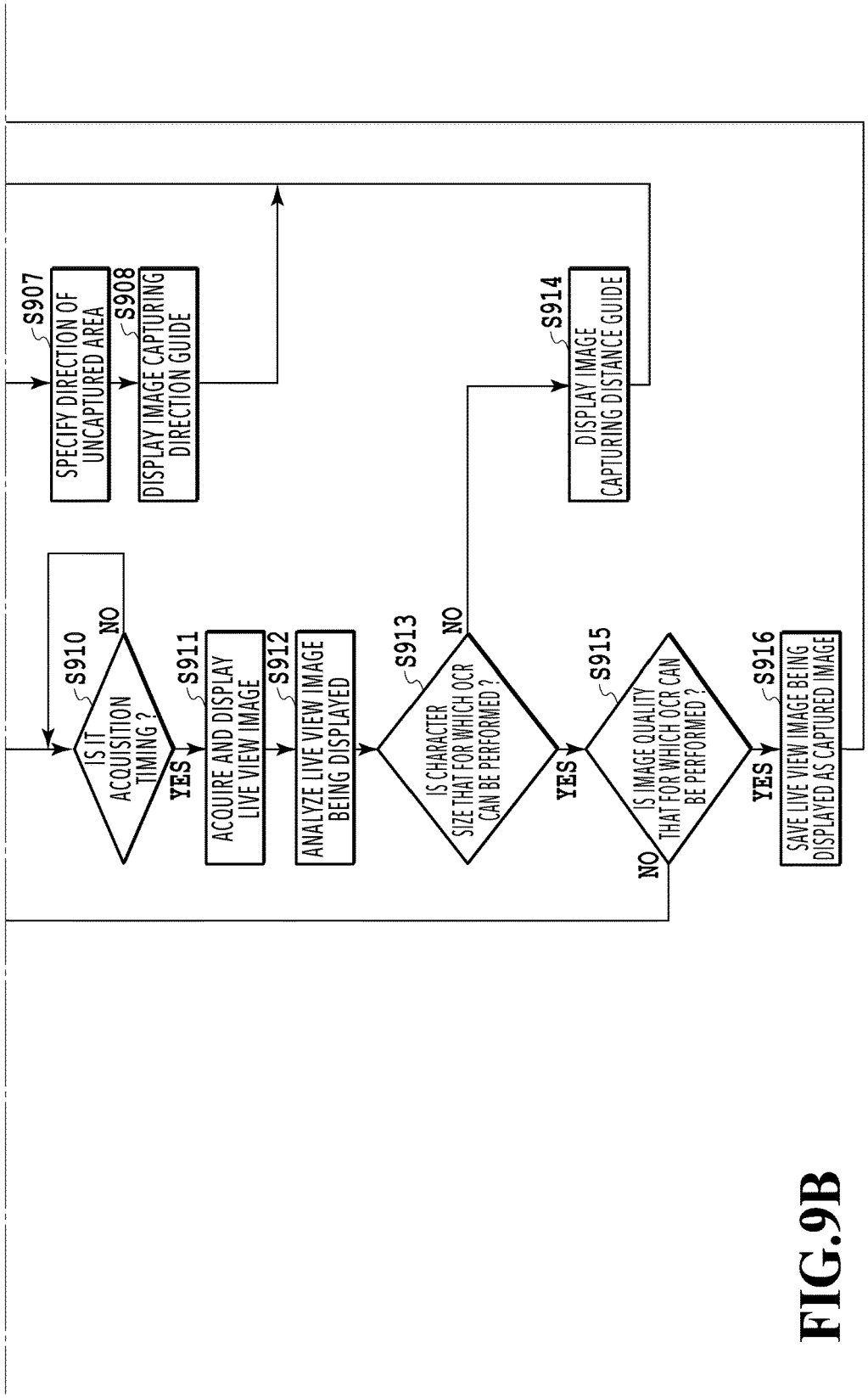
FIG. 9 is a diagram showing a relationship between FIGS. 9A and 9B, and FIGS. 9A and 9B are flowcharts showing a flow of processing to acquire second and subsequent captured images.

The above is the contents of the processing until the first captured image is acquired. In the present embodiment, in the stage where the live view image is determined to be suitable to OCR processing, the live view image is saved as a captured image, but it may also be possible to save the live view image upon receipt of image capturing instructions of a user. This point is the same in the flow in FIGS. 9A and 9B, to be described later. In the case where the first captured image is acquired, processing to capture the entire target document (processing to acquire the second and subsequent captured images) while moving the mobile terminal 100 by taking the initial position as the start point is performed. In the present embodiment, a case is explained as an example where the top-left corner of the target document is taken to be the start point and the bottom-left corner is taken to be the end point, and a total of six captured images are acquired by performing image capturing six times in total and after this, one entire image is generated by combining the six captured images. Here, it is assumed that the fundamental information, such as the start point and the end point of the image capturing position, the total number of times of image capturing, and the image capturing order, is set in advance and stored in the RAM 202 and the like. FIGS. 9A and 9B are flowcharts showing a flow of the processing to acquire the second and subsequent captured images.

At step 901, the image analysis module 315 determines whether the image capturing of the entire document has been completed based on the captured images stored in the image combination module 316. In the present embodiment in which image capturing is performed six times in total, in the case where six captured images are saved, it is determined that the image capturing of the entire document has been completed. In the case where the image capturing of the entire document has been completed, the processing advances to step 917. On the other hand, in the case where there is an uncaptured area, the processing advances to step 902.

At step 902, the main control module 311 determines whether it is timing to acquire data of a live view image taken in via the camera unit 206, as at step 501 described previously. In the case where the main control module 311 determines that it is timing to acquire a live view image, the processing advances to step 903.

Figure 10:
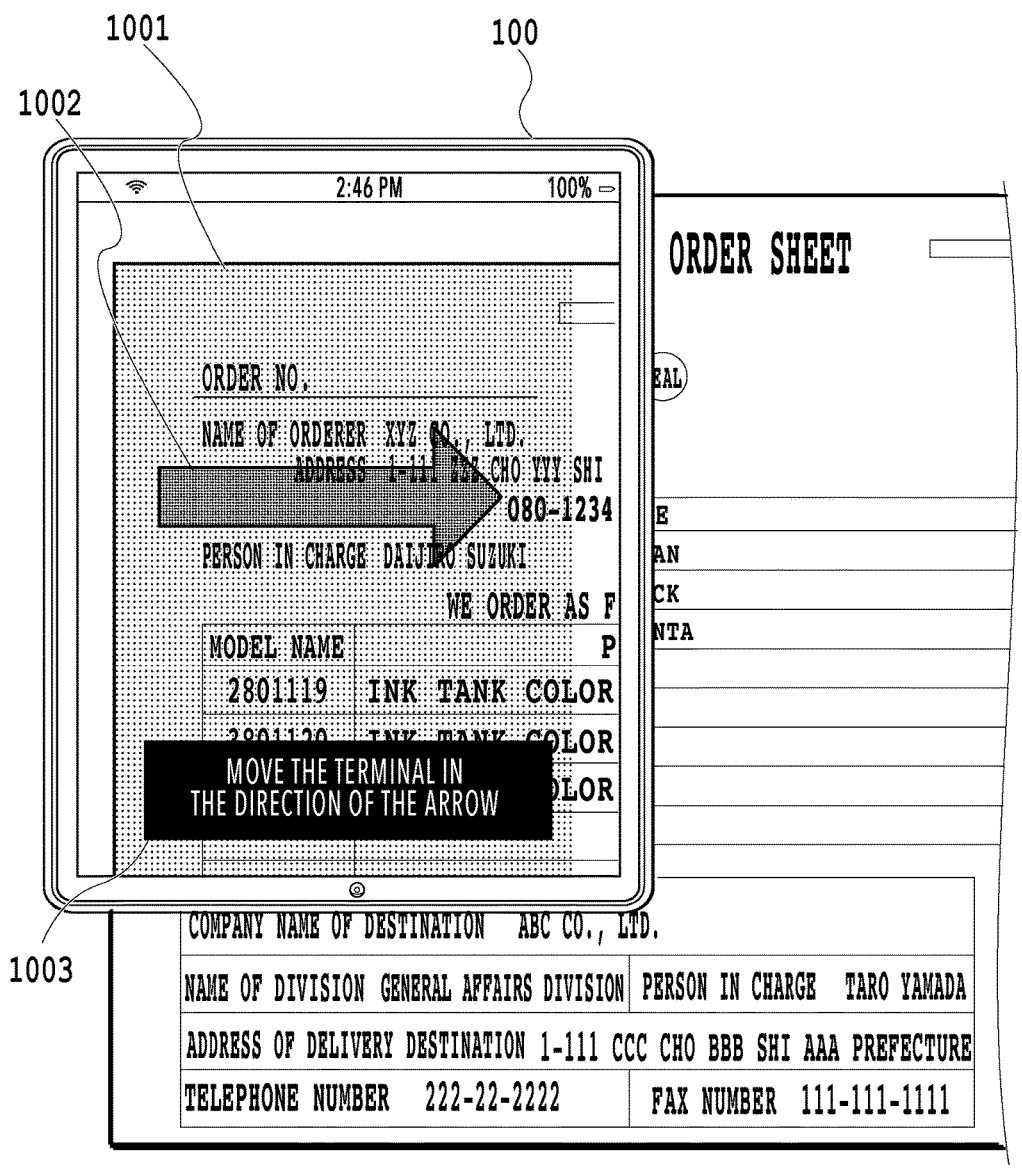
FIG. 10 is a diagram showing an example of an image capturing direction guide.

At step 903, the image acquisition module 314 acquires data of a live view image. The acquired live view image is displayed in the display/operation area 400 of the touch panel 101 by the display control module 312. At step 904 that follows, the display control module 312 identifiably displays the area (already-captured area) corresponding to the captured image, which is already saved, of the live view image currently being displayed. As described previously, the intervals at which the camera unit 206 acquires a live view image are as short as 100 ms. Because of this, even in the case where a user moves the mobile terminal 100, a state is brought about where part of the already-saved captured image is included within the live view image currently being displayed. Consequently, feature amount extraction processing is performed for both the already-saved captured image and the live view image currently being displayed and the extracted feature points are compared (mapping processing is performed). Due to this, the area occupied by the already-saved captured image of the live view image currently being displayed is specified and the specified area is displayed identifiably in gray-out and the like. FIG. 10 shows a state where the area occupied by the already-saved captured image is displayed identifiably in the live view image currently being displayed. In FIG. 10, a rectangular area 1001 somewhat darkly displayed in gray-out represents the area of the already-saved captured image. What is required is to enable a user to recognize the portion occupied by the already-saved captured image, and therefore, it may also be possible to, for example, highlight the image capturing area that is not saved yet, which is desired to be captured, while displaying the portion occupied by the already-saved captured image as it is.

At step 905, the image analysis module 315 finds the ratio in which the already-saved captured image displayed identifiably occupies the live view image currently being displayed and determines whether the ratio that is found is within a predetermined range. Here, the predetermined range is, for example, a ratio of 10%, and it may be possible for a user to arbitrarily set the predetermined range by taking into consideration the margin at the time of combining a plurality of saved captured images. In the case where the ratio of the already-captured area is within the predetermined range, the processing advances to step 909. On the other hand, in the case where the ratio of the already-captured area is outside the predetermine range, the processing advances to step 906.

At step 906, the image analysis module 315 determines whether the edge (here, the top-right corner) of the target document on the side of the movement direction is included within the live view image currently being displayed. The specific determination method is the same as that at step 504 described previously. Here, the reason the "edge" is referred to in place of the "corner" is that a guide display indicating the next movement direction becomes necessary with the left and right edges, not the corner, being detected as a trigger in the case where a target document is captured by dividing the target document into three portions in the vertical direction and three portions in the horizontal direction, respectively, and by diving image capturing into nine times in total. In the case where the edge of the target document on the side of the movement direction is detected, the processing advances to step 909. On the other hand, in the case where the edge of the target document on the side of the movement direction is not detected, the processing advances to step 907.

At step 907, the image analysis module 315 specifies in which direction an area (uncaptured area) that should be captured next is located with respect to the live view image currently being displayed by referring to the above-described fundamental information. Then, at step 908 that follows, the display control module 312 displays an image capturing direction guide to prompt a user to move the mobile terminal in the specified direction. In FIG. 10, a rightward arrow 1002 and a rectangular area 1003 including a message of white-solid characters are an example of the image capturing direction guide that is displayed at this step. By the image capturing direction guide such as this being displayed, it is possible for a user to instantaneously understand in which direction the mobile terminal 100 should be moved. Further, it may also be possible to notify a user of the direction in which the mobile terminal 100 should be moved by voice or vibration in place of or in addition to the above-described guide display. In the case where the image capturing direction guide is displayed, the processing returns to step 902.

Figure 11A:
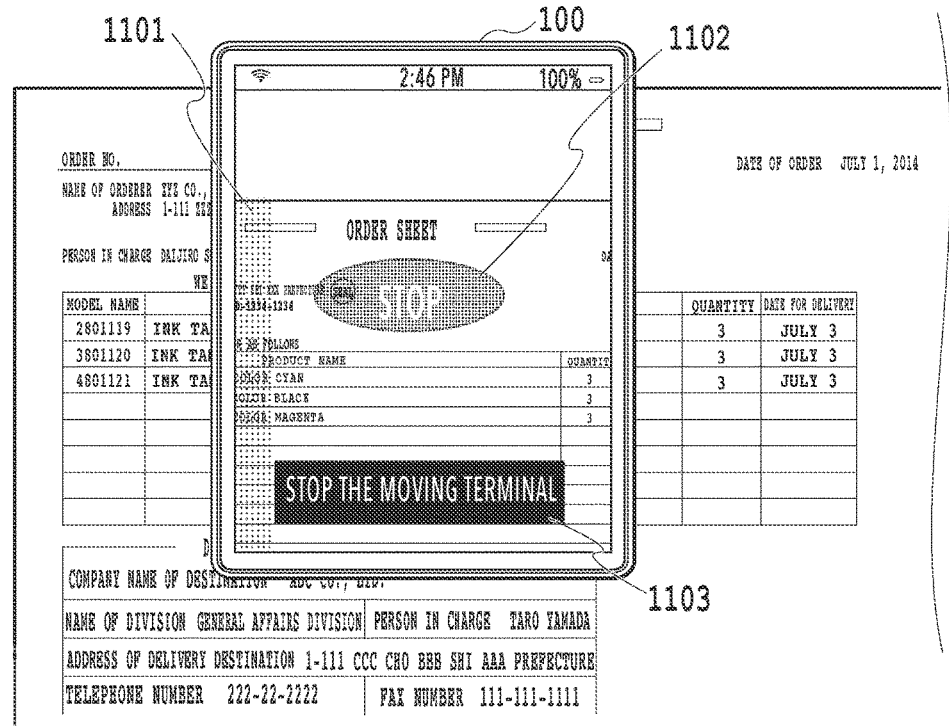
FIG. 11A and FIG. 11B are each a diagram showing an example of a stop instruction guide.
Figure 11B:
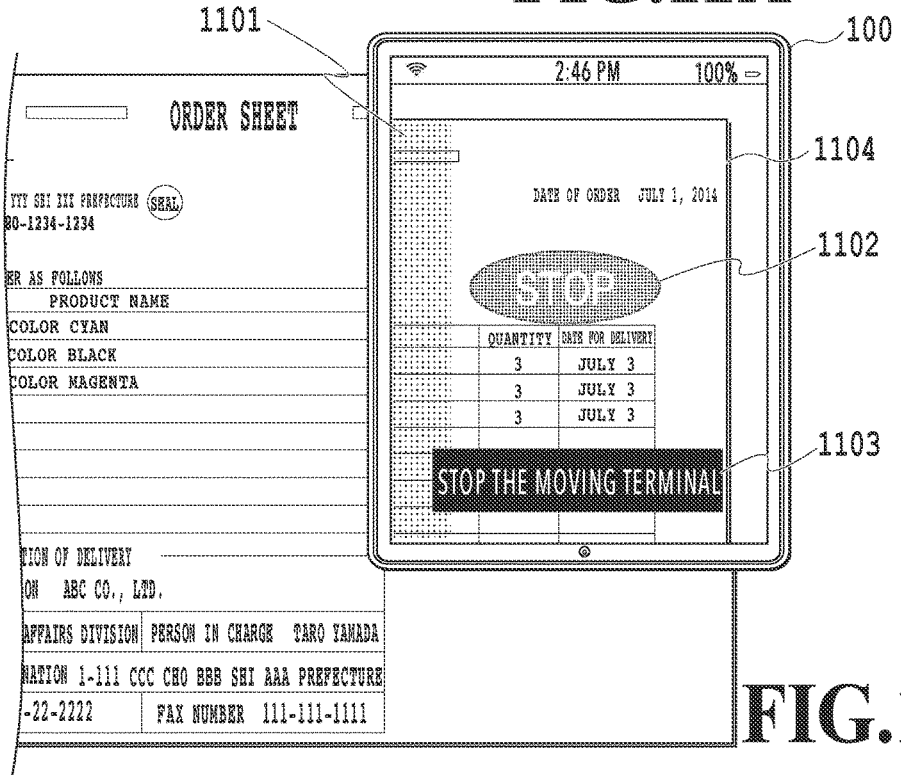

At step 909, the display control module 312 displays the stop instruction guide to prompt a user to stop the mobile terminal 100. FIG. 11A and FIG. 11B are each a diagram showing an example of the stop instruction guide. FIG. 11A is the stop instruction guide in the case where it is determined that the ratio of the already-captured area is within the predetermined range (Yes at step 905) and FIG. 11B is the stop instruction guide in the case where the corner of the target document on the side of the movement direction is detected (Yes at step 906). In the example in FIG. 11A, the top-right corner of the target document is not detected yet. However, the ratio of an already-captured area 1101 displayed in gray-out becomes small and reaches 10% of the entire live view image being displayed, and therefore, a mark 1102 of "STOP" and a message 1103 of "Stop the terminal" are displayed as the stop instruction guide. On the other hand, in the example in FIG. 11B, an edge (that is, right edge) 1104 of the target document on the side of the movement direction is detected, and further, the top-right corner is detected. Consequently, although the ratio of the already-captured area 1101 displayed in gray-out is larger than 10%, the mark 1102 of "STOP" and the message 1103 of "Stop the terminal" are displayed as the stop instruction guide.

At step 910, as at step 902, the main control module 311 determines whether it is timing to acquire data of a live view image taken in via the camera unit 206. In the case where the main control module 311 determines that it is timing to acquire a live view image, the image acquisition module 314 acquires data of a live view image at step 911. The acquired live view image is displayed in the display/operation area 400 of the touch panel 101 by the display control module 312.

Then, at step 912, the image analysis module 315 performs an image analysis to check whether the live view image acquired at step 911 and currently being displayed is an image suitable to OCR processing, as at step 505 described previously. At step 913 that follows, the image analysis module 315 determines whether the character size within the text area included in the live view image being displayed is a predetermined character size suitable to OCR processing based on the character size information of the results of the analysis at step 912, as at step 506 described previously. In the case where it is determined that the size of the character included in the live view image being displayed is not a size suitable to OCR processing, the processing advances to step 914. On the other hand, in the case where it is determined that the size of the character is a size suitable to OCR processing, the processing advances to step 915. Then, at step 914, the display control module 312 displays an image capturing distance guide to prompt a user to perform an operation so that the distance between the image capturing lens 102 and the target document becomes appropriate, as at step 507 described previously.

At step 915, the image analysis module 315 determines whether the character within the text area of the live view image being displayed is definite in a degree in which a predetermined character recognition rate can be obtained based on the character edge information of the results of the analysis at step 912, as at step 508 described previously. In the case where it is determined that the definition of the character included in the live view image being displayed is poor and the image quality is not suitable to OCR processing, the processing returns to step 902 and then the next live view image is acquired. On the other hand, in the case where it is determined that the definition of the character is good and the image quality is suitable to OCR processing, the processing advances to step 916.

Figure 12:
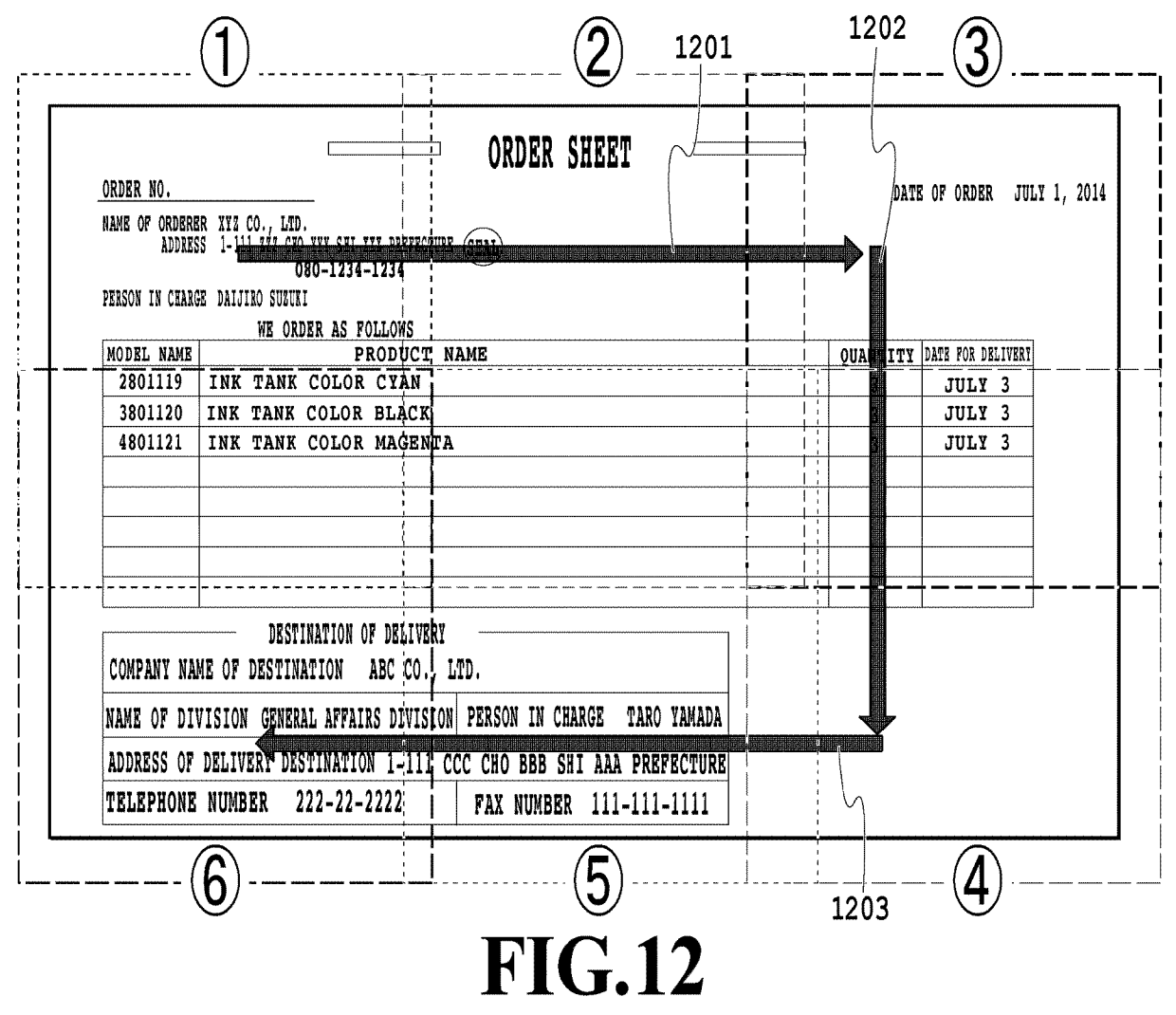

At step 916, the image combination module 316 saves (stores in the RAM 202) the data of the live view image acquired at step 911 as a captured image used for combination processing, as at step 510 described previously. After saving the image data, the processing returns to step 901. In this manner, by repeating the processing at each of step 901 to step 916, the captured image data that covers the entire target document and whose image quality is suitable to OCR processing is acquired and saved. FIG. 12 shows a captured image corresponding to a total of six captured images acquired and saved in the case where the order sheet 110 as an object shown in FIG. 1B is captured by dividing image capturing into six times. In FIG. 12, numbers surrounded by a circle indicate the image capturing order and as described previously, the image capturing starts from the top-left corner and ends at the bottom-left corner. Further, in FIG. 12, thick-line arrows 1201 to 1203 represent directions indicated by the image capturing direction guides sequentially displayed at step 908 during the period of time during which the image capturing of the entire target document is completed. It is known that a direction different from the direction hitherto displayed is displayed as a guide in the case where the already-saved captured area reaches the edge (corner) of the target document. First, a user captures the top-left corner of the order sheet 110, and then, moves the mobile terminal 100 rightward in accordance the image capturing direction guide and in the case where the right edge is reached, moves the mobile terminal 100 downward and moves the mobile terminal 100 leftward in the case where the bottom edge is reached, and thereby, a user captures the entire order sheet 110.

Then, at step 917, the image combination module 316 combines (synthesizes) all the saved captured images and generates an entire image corresponding to the entire target document. FIG. 13 shows the way one entire image is finished by combining a total of six captured images. Each captured image has a portion overlapped by another captured image and for example, between captured images 1301 and 1302, a rectangle 1310 indicated by a one-dot chain line is the overlap portion and between the captured image 1301 and a captured image 1306, a rectangle 1311 indicated by a one-dot chain line is the overlap portion. Because of this, the overlap portions are specified based on the feature amount of each captured image and then, each captured image is combined into one image 1320 as shown at the bottom in FIG. 13. At this time, in order to increase the character recognition accuracy of OCR processing for the finished entire image, it may also be possible to link the captured images at the portion where no character exists or to adjust the magnification of each captured image. Further, it may also be possible to control the guide display so that the overlap portion with another captured image becomes as large as possible and to employ a captured image of a higher image quality for the overlap portion with another captured image of each of the acquired and saved captured images at the time of combination.

Modification Example

Figure 14:
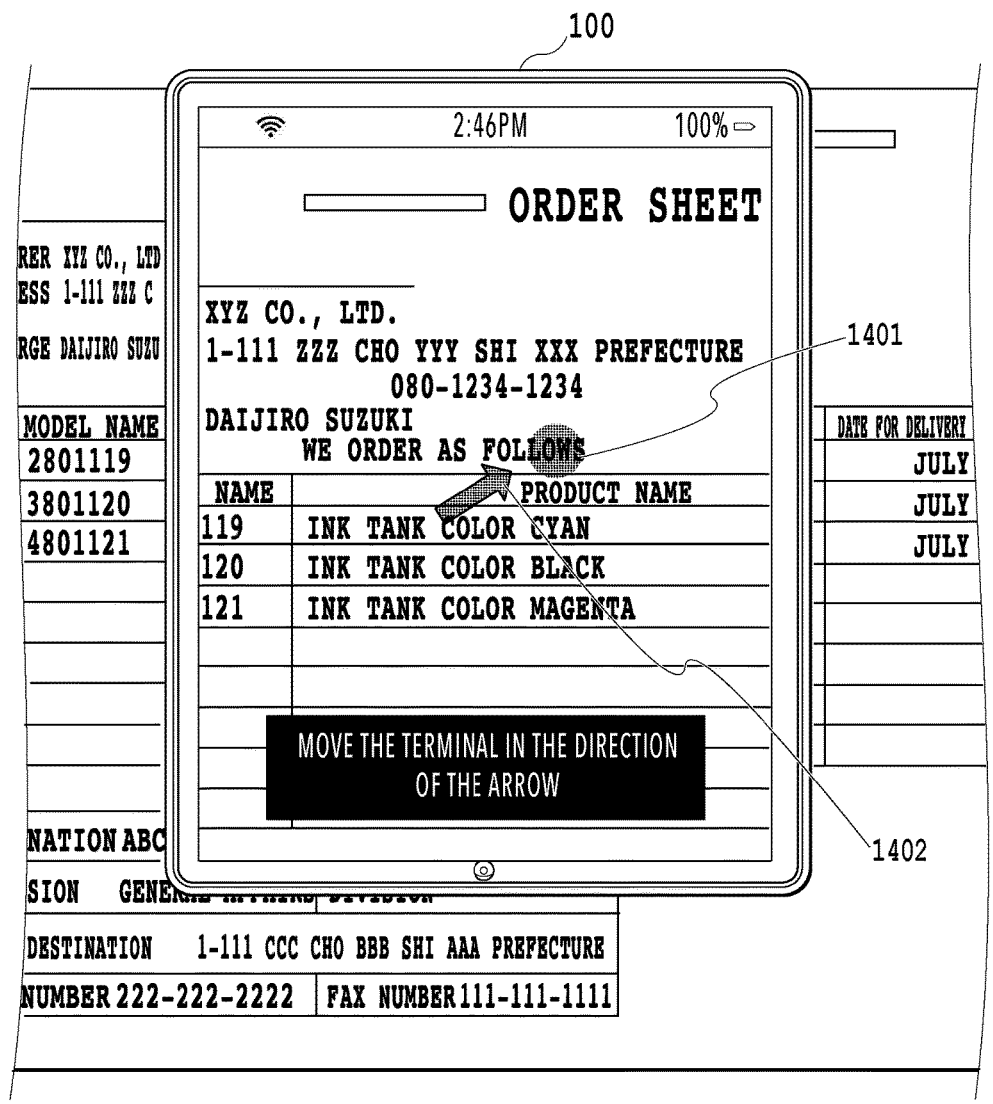
FIG. 14 is a diagram showing an example of a display of an image capturing direction guide according to a modification example.

The image capturing direction guide in the above-described embodiment only specifies the direction in which the mobile terminal 100 is moved by the upward, downward, leftward, and rightward arrows. In place of this, it may also be possible to display an arrow facing toward the center point of an uncaptured area that should be captured next. Due to this, it is possible to specify a more detailed movement direction for a user. Furthermore, it may also be possible to gradually shorten the length of an arrow that is displayed as the distance from the center point becomes shorter in accordance with the movement of the mobile terminal 100. Due to this, it is possible to prompt a user to decrease the moving speed of the mobile terminal 100. FIG. 14 is a diagram showing an example of a display of an image capturing direction guide according to the present modification example. In FIG. 14, a black circle 1401 indicates the center point of the area that should be captured next and an arrow 1402 specifying the movement direction toward the center point 1401 is displayed. In the case where a user moves the mobile terminal 100 in accordance with the arrow 1402, the length of the arrow 1402 becomes shorter in accordance with the distance from the center point 1401.

The control in the case where the guide display of the present modification example is produced is as follows. First, in specifying the direction of an uncaptured area (step 907), the center point of the area that is captured next is determined by taking into consideration how much the captured images overlap while referring to the fundamental information described previously. Then, in displaying the image capturing direction guide (step 908), an arrow and a center point that indicate the direction and the distance in which and by which to move next are displayed based on the distance to and the direction of the determined center point.

As above, according to the present embodiment, in the case where the entire target document is captured by dividing image capturing into a plurality of times, it is possible for a user to easily obtain a captured image of image quality suitable to OCR processing only by moving the mobile terminal in accordance with the guide display.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in the case where a user captures a target document by a mobile terminal by dividing image capturing into a plurality of times, it is possible to easily perform image capturing with image quality suitable to OCR processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-011976, filed Jan. 26, 2017, which is hereby incorporated by reference wherein in its entirety.

What is claimed is:

1. An information processing apparatus having a camera function, comprising:
 a memory for storing a computer program; and
 a processor for executing the computer program to perform:
  controlling to display, on a display, a live view image acquired via a camera;
  determining, by analyzing the live view image, a direction of an uncaptured area that should be captured next in an object and whether the live view image is an image suitable to OCR processing; and
  controlling, in accordance with analysis results of the live view image, to display a guide on the live view image in an overlapping manner, wherein
  the displayed guide is a guide to prompt a user to perform an operation so that an image corresponding to the determined direction of the uncaptured area of the object is captured next.

2. The information processing apparatus according to claim 1, wherein
 in the analysis of the live view image, the determining whether the live view image is an image suitable to OCR processing is performed based on a character size in a text area included in the live view image, and
 in a case where it is determined that the character size is not a character size suitable to OCR processing, the displayed guide is a guide to prompt the user to perform an operation so that a distance between the camera and the object becomes appropriate.

3. The information processing apparatus according to claim 2, wherein
 in a case where it is determined that the character size is not a character size suitable to OCR processing because of being too small, the displayed guide is a guide to prompt the user to perform an operation so that the distance between the camera and the object becomes shorter; and
 in a case where it is determined that the character size is not a character size suitable to OCR processing because of being too large, the displayed guide is a guide to prompt the user to perform an operation so that the distance between the camera and the object becomes longer.

4. The information processing apparatus according to claim 1, wherein
 in the analysis of the live view image, the determining whether the live view image is an image suitable to OCR processing is performed based on definition of a character within a text area included in the live view image, and
 in a case where it is determined that the definition of the character is determined not to be definition suitable to OCR processing, the displayed guide is a guide to prompt a user to stop a user moving the camera.

5. The information processing apparatus according to claim 1, wherein
when the capturing of the object is started, the processor further controls to display a guide to adjust an initial position in image capturing, and
in the analysis of the live view image, in a case where the analysis of the live view image being displayed indicates that a user operation in accordance with the guide to adjust the initial position has been performed, the determining whether the live view image is an image suitable to OCR processing is performed.

6. The information processing apparatus according to claim 5, wherein
in the analysis of the live view image,
processing to detect a corner of the object is performed for a predetermined area within the live view image, which is displayed in the guide for adjusting the initial position, and
in a case where the corner is detected in the detection, it is determined that a user operation in accordance with the guide for adjusting the initial position has been performed.

7. The information processing apparatus according to claim 5, wherein
the processor further controls to store captured images obtained by the plurality of times of image capturing in the memory and to generate an image corresponding to the whole of the object by combining the plurality of stored captured images, and
in a case where a user operation in accordance with the guide for adjusting the initial position has been performed and in a case where it is determined that the live view image is an image suitable to OCR processing, the processor stores the live view image in the memory as a first captured image.

8. The information processing apparatus according to claim 1, wherein
the processor further controls to display an already-captured area on the live view image so that the already-captured area can be identified.

9. The information processing apparatus according to claim 8, wherein
in image capturing to acquire second and subsequent captured images of the plurality of times of image capturing,
in the analysis of the live view image, a ratio in which the already-captured area occupies the live view image is found and whether the ratio is within a predetermined range is determined; and
in a case where the ratio is within a predetermined range, the processor further controls to display a guide to prompt a user to stop a user moving the camera.

10. The information processing apparatus according to claim 9, wherein
in the analysis of the live view image, in a case where the ratio is outside a predetermined range, processing to detect an edge of the object is further performed for the live view image, and
in a case where the edge is detected in the detection, the processor further controls to display a guide to prompt a user to stop a user moving the camera.

11. The information processing apparatus according to claim 10, wherein
in the analysis of the live view image, in a case where the edge is not detected in the detection, processing to specify a direction of an uncaptured area that should be captured next is further performed, and
the processor further controls to display a guide to prompt a user to move the camera in the specified direction.

12. The information processing apparatus according to claim 11, wherein
the guide to prompt a user to move the camera in the specified direction is a guide which displays an arrow facing toward a center point of the uncaptured area.

13. The information processing apparatus according to claim 12, wherein
the processor controls to shorten a length of the arrow as a distance from the center point becomes shorter.

14. The information processing apparatus according to claim 1, wherein
the object is a document.

15. The information processing apparatus according to claim 1, wherein
the object is a whiteboard.

16. A control method in an information processing apparatus having a camera function, the control method comprising the steps of:
displaying, on a display, a live view image acquired via a camera of the information processing apparatus;
determining, by analyzing the live view image, a direction of an uncaptured area that should be captured next in an object and whether the live view image is an image suitable to OCR processing;
displaying, in accordance with analysis results of the live view image, a guide on the live view image in an overlapping manner, wherein
the displayed guide is a guide to prompt a user to perform an operation so that an image corresponding to the determined direction of the uncaptured area of the object is captured next.

17. A non-transitory computer readable storage medium storing a program for causing a computer to perform a control method in an information processing apparatus having a camera function, the control method comprising the steps of:
displaying a live view image acquired via the camera function of the information processing apparatus;
determining, by analyzing the live view image, a direction of an uncaptured area that should be captured next in an object and whether the live view image is an image suitable to OCR processing; and
displaying, in accordance with analysis results, a guide on the live view image in an overlapping manner, wherein
the displayed guide is a guide to prompt a user to perform an operation so that an image corresponding to the determined direction of the uncaptured area of the object is captured next.

* * * * *